United States Patent [19]

Schoettle et al.

[11] Patent Number: 5,458,236

[45] Date of Patent: Oct. 17, 1995

[54] CONTAINER, SUBSTANTIALLY OF CUBOID FORM, FOR AT LEAST TWO ARTICLES

[75] Inventors: Klaus Schoettle, Strasbourg, France; Wolfgang Klammer, Ortenberg; Gerald-Wolfgang Borck, Ludwigshafen, both of Germany

[73] Assignee: BASF Magnetics GmbH, Mannheim, Germany

[21] Appl. No.: 182,702

[22] Filed: Jan. 13, 1994

[30] Foreign Application Priority Data

Jan. 18, 1993 [DE] Germany ............... 9300553 U

[51] Int. Cl.6 ............................................. B65D 69/00
[52] U.S. Cl. ............................................. 206/232; 206/39
[58] Field of Search ................... 206/39, 39.5, 232, 206/387

[56] References Cited

U.S. PATENT DOCUMENTS

| | | | |
|---|---|---|---|
| 4,143,764 | 3/1979 | Moss, III | 206/429 |
| 4,457,428 | 7/1984 | Saito | 206/387 |
| 4,923,062 | 5/1990 | Hehn et al. | 206/387 |
| 4,928,818 | 5/1990 | Friess et al. | 206/387 |
| 4,934,520 | 6/1990 | Okada | 206/39 |
| 4,978,006 | 12/1990 | Juteau | 206/232 |
| 5,069,333 | 12/1991 | Chen | 206/39.5 |
| 5,085,322 | 2/1992 | Lax | 206/387 |
| 5,219,090 | 6/1993 | Vollmann | 206/387 |
| 5,277,313 | 1/1994 | Morita | 206/387 |

*Primary Examiner*—David T. Fidei
*Attorney, Agent, or Firm*—Keil & Weinkauf

[57] ABSTRACT

A container for at least two separate articles with separate receiving spaces, the dividing wall being movable and it being possible as a result to vary the momentary size of the receiving spaces, thereby also facilitating the accessibility and removability of the articles. The container can be suitably used for any type of articles, in particular for recording carriers and insert sheets.

18 Claims, 4 Drawing Sheets

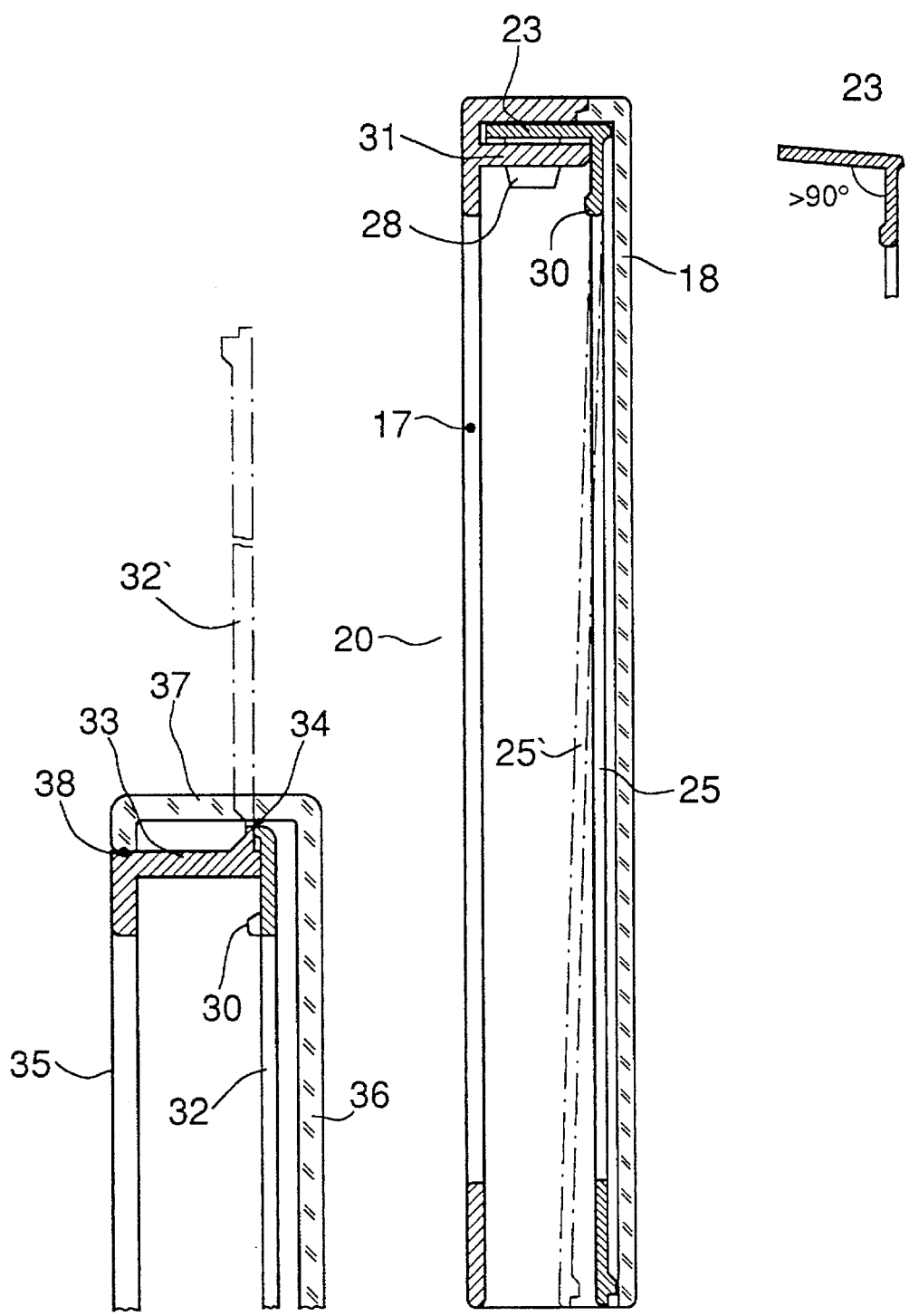

CONTAINER, SUBSTANTIALLY OF CUBOID FORM, FOR AT LEAST TWO ARTICLES

BACKGROUND OF THE INVENTION

1. Field of the Invention

The present invention relates to a container of substantially cuboid form for at least two articles, in particular for a recording carrier and an insert in sheet or card form, bottom and top parts of said container being provided with at least one side wall part and one rear wall part each and having at least one dividing intermediate wall, which divides the cuboid-form interior into at least two receiving spaces lying flat one above the other for the articles.

2. Description of the Prior Art

Such a container for an audio-tape cassette, which is referred to as a one-hand case and is open on one side, is known. This one-hand case comprises a bottom part and a top part, the bottom part being formed with one rear wall and two long side walls and the top part, in the form of an L in cross section, being connected to the edges of the rear wall and of one side wall of the bottom part, and the second side wall being connected to the bottom wall, extending around it at a distance. The bottom wall is formed with a rectangular cutout, so that it forms a frame body. Arranged at the edges of the long side walls are webs, arranged parallel to the bottom wall and at a distance from the top wall, so that above the webs there is a space for the cassette and below the webs and laterally between bottom part and top part there is an L-shaped space for a folding insert. Since the latter space is not completely filled by the folding insert or other documentation material, the container undergoes a considerable bending deflection at this wall, in particular if the outer packaging of the container takes the form of a shrink film. In the case of the plastics used, this bending deflection is transformed from the elastic range into the permanently deformed range after storage for a short time, with the result that afterwards the insertion and removal of the folding insert is at least made more difficult.

The production of the bottom part by injection molding requires a very complicated and expensive injection mold having a plurality of slides, and automatic ejecting of the finished molding is made considerably more difficult.

It is an object of the present invention to improve a container of the type described at the beginning, in particular with a view to simple production by injection molding, and also to facilitate its handling.

We have found that this object is achieved with a container of substantially cuboid form for at least two articles, in particular for a recording carrier and an insert in sheet or card form, bottom and top parts of said container being provided with at least one side wall part and one rear wall part each and having at least one dividing intermediate wall, which divides the cuboid-form interior into at least two receiving spaces lying flat one above the other for the articles, by said container comprising as the intermediate wall a movable, substantially flat wall part which has approximately perpendicularly to its surface at least one continuation which corresponds in its height approximately to the clear height of at least one of the receiving spaces.

By providing such a movable wall part, both handling during removal of cassette and insert and production by injection molding are considerably improved and, in addition, the risk of permanent deformation of the container is significantly reduced.

The movable wall part may be formed as a separate wall part, which makes production very much more simple and inexpensive, or it may also be produced such that it is connected to one of the bottom or top parts, in particular by means of a film hinge, with the result that simplified and cost-effective production in comparison with the prior art is likewise achieved.

The movable wall part is expediently arranged vertically displaceably between the side wall parts of the bottom part and/or top part. Consequently, the respective receiving compartment of the container about to be filled can be set in size for filling by displacing the movable wall part and, by displacing again, the other compartment can similarly be made accessible.

This mobility or displaceability is able to be accomplished by the wall part having a width, or the side wall parts having a distance from each other such that the wall part is able to be fixed, in particular able to be clamped in, releasably between the mutually facing surfaces of the side wall parts.

The inner surfaces of the mutually facing side wall parts may have for this purpose a conicity, in particular in the range of 3°.

The wall part is, however, to be clamped in between the side wall part surfaces with a clamping force of less than 200 mN. It is also favorable if on the side wall parts there are provided catching lugs which can be overcome when the wall part is vertically displaced.

This allows a desired position of the wall part to be set effortlessly. It is expedient for reasons of stability and strength that in the region of the front edge of the wall part there is provided a transverse rib, by the height of which the clear height of a receiving space is determined. This transverse rib thus likewise acts as a continuation for the purposes of the present invention.

In practice, the continuation may be formed on the wall part as a holding continuation at the rear end, the height of which corresponds approximately to the sum of the clear heights of the two receiving spaces.

It is also favorable if on the wall part there is provided at least one catching or arresting lug for the article to be received in the container, in particular for the recording carrier. It is also favorable in terms of production if arresting projections are provided on the at least one holding continuation, and if clearances are provided in the wall part above the arresting projections.

It is advantageous in practice for the bottom part to be formed substantially by a bottom wall and rear and side wall parts. This dispenses with the resting webs and achieves simple production. The top part expediently substantially comprises the top wall and a long side wall part and is consequently likewise easy to produce.

The bottom wall and/or top wall or an outer side wall part may have a cutout, in particular a rectangular cutout, for pushing out the article received.

In terms of material and in terms of design it is favorable if the movable wall part has a cutout, in particular a rectangular cutout.

Exemplary embodiments of the invention are represented in the drawing and described below.

BRIEF DESCRIPTION OF THE DRAWINGS

In the drawing:

FIG. 3 shows a longitudinal sectional view of the container according to FIG. 1

FIG. 3a shows a partial sectional view of the wall part from FIG. 3

FIG. 4 shows a partial longitudinal sectional view with molded-on wall part

DESCRIPTION OF THE PREFERRED EMBODIMENTS

Figure 5:
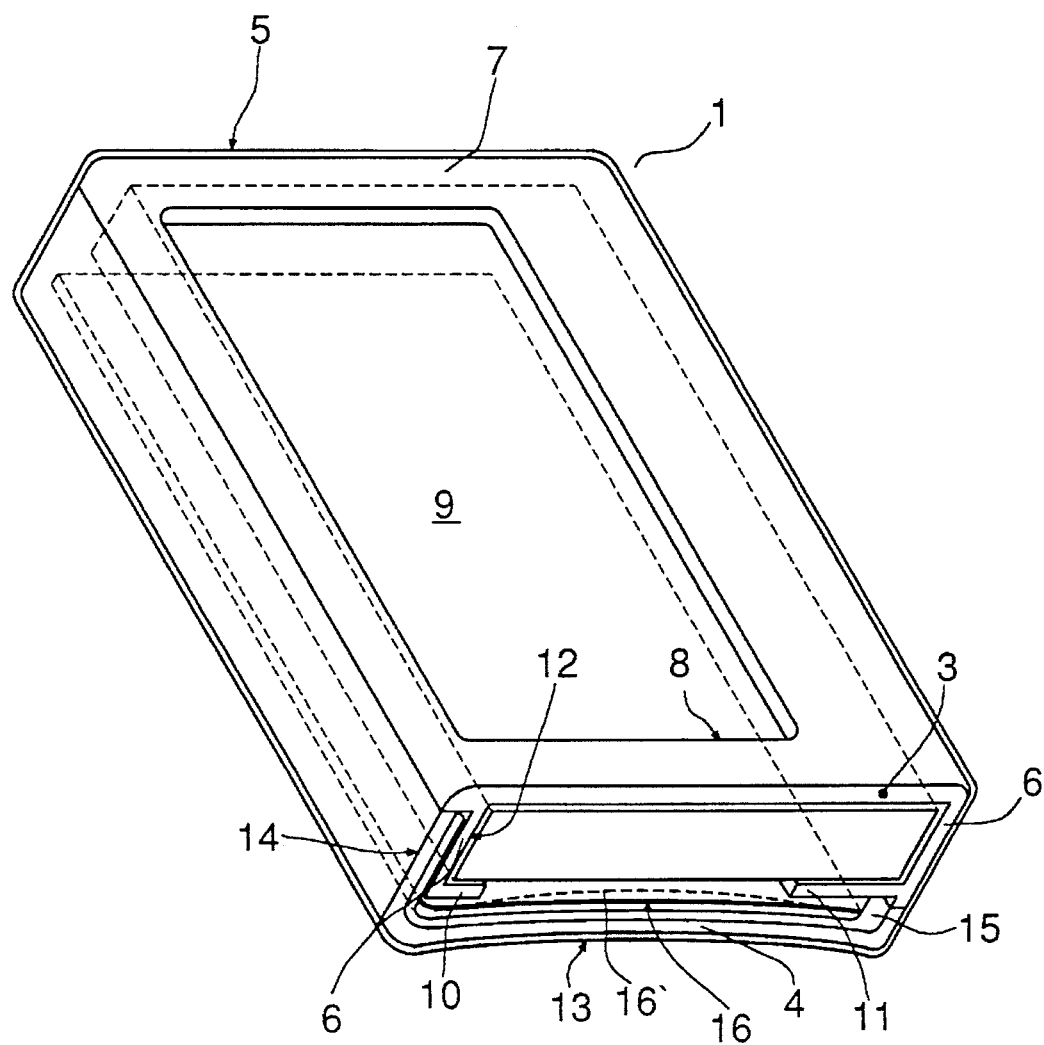
FIG. 5 shows a container for DCC cassettes as prior art

FIG. 5 shows a container 1 for digital compact cassettes, DCC cassettes for short, which is designed as a one-hand case. It comprises a bottom part 3 and a top part 4. According to the representation, the designation should be the other way round, but since this is not essential for the invention this designation is retained. The bottom part 3 has a rear wall 5, two side walls 6 and a bottom wall 7, in which there is a rectangular cutout 8, through which the DCC cassette 9 lying inside can be pushed out from the container 1 by one-hand operation. Resting webs 10 and 11 are molded on the free edges of the side wall 6, with the result that a first, relatively large receiving space 12 is formed for the DCC cassette 9. The top part 4 is formed cross-sectionally in the form of an L, with a not cut-out top wall 13 and a long side wall 14, which runs approximately parallel and at a distance from a side wall 6 of the bottom part 3. The second, smaller receiving space 15 for an insert 16 in the form of a sheet or book or carton is formed by the space between top wall 13 and resting webs 10 and 11 and also by the distance between the side walls 6 and 13.

Both parts, bottom part 3 and top part 4, are produced by injection molding, for example the bottom part 3 from ABS plastic and the top part 4 from SAN plastic, it being desirable to select plastics which can be firmly welded or adhesively bonded.

The filled container 1 is usually wrapped completely in a film and the film is subjected to a thermal shrinking process, the film drawing together and normally bringing about the described bending deflection of the top wall 13. This bending deflection scarcely makes the removal of the DCC cassette 9 any more difficult, but brings about an arching of the usually flexible insert 16, which after removal of the cassette 9 may assume the dot-dashed form 16. Consequently, however, unhindered pushing in of the cassette 9 is no longer possible or the insert is damaged, and the insert 16 must be removed in advance and can be inserted again without any problem after introducing the cassette 9. In addition, the bottom part 3 is able to be produced by injection molding only with a very complicated and expensive mold, which requires a plurality of slides, in particular for shaping the webs 10 and 11. Similarly, the ejecting of the bottom part 3 is very difficult to automate.

Figure 1:
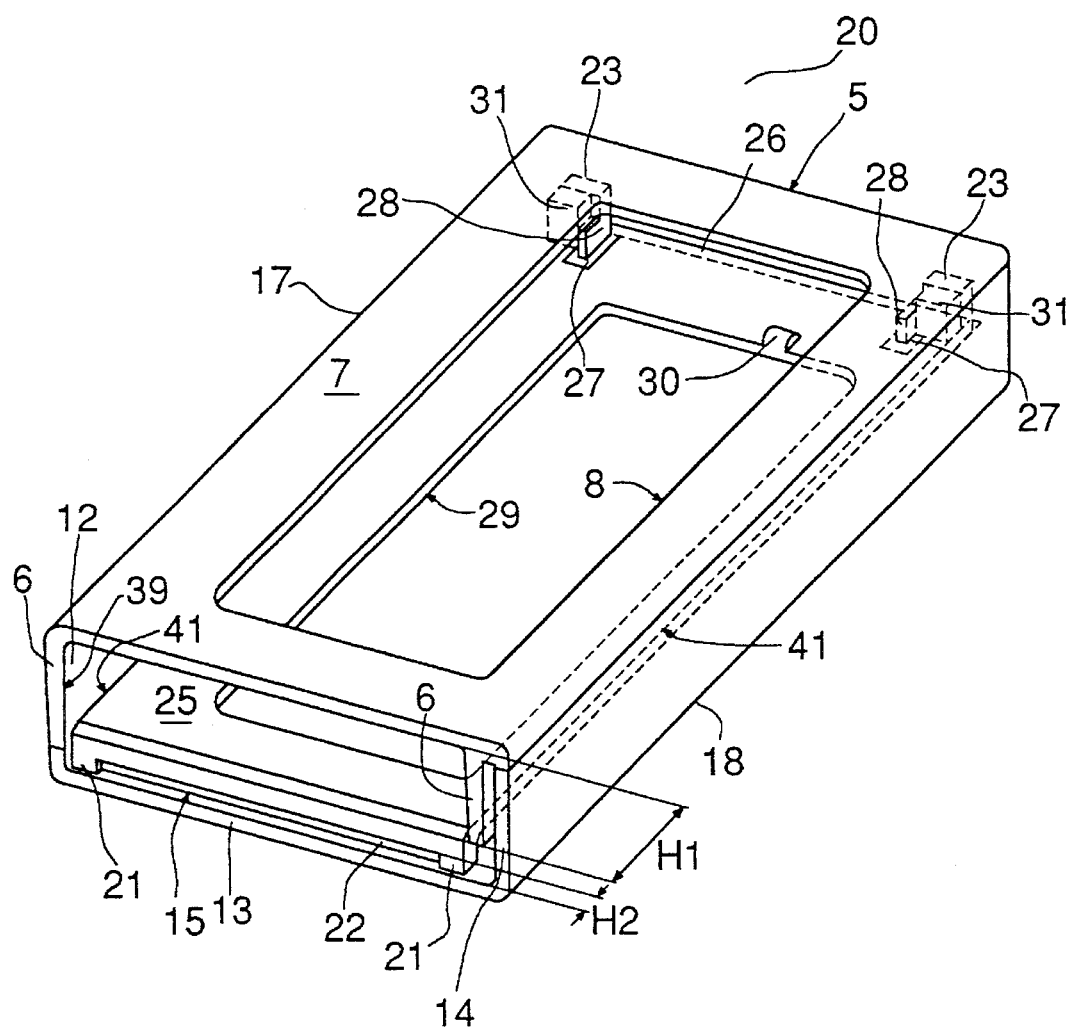
FIG. 1 shows a container according to the invention

In FIG. 1, a container 20 according to the invention is shown, comprising a bottom part 17 and a top part 18, the top part 18 corresponding in terms of its form to the top part 4. The bottom part 17 is formed, however, without resting webs and otherwise substantially comprises, in an unchanged way, rear wall 5, side walls 6 (without webs 10 and 11) and bottom wall 7 with cutout 8.

Figure 2:
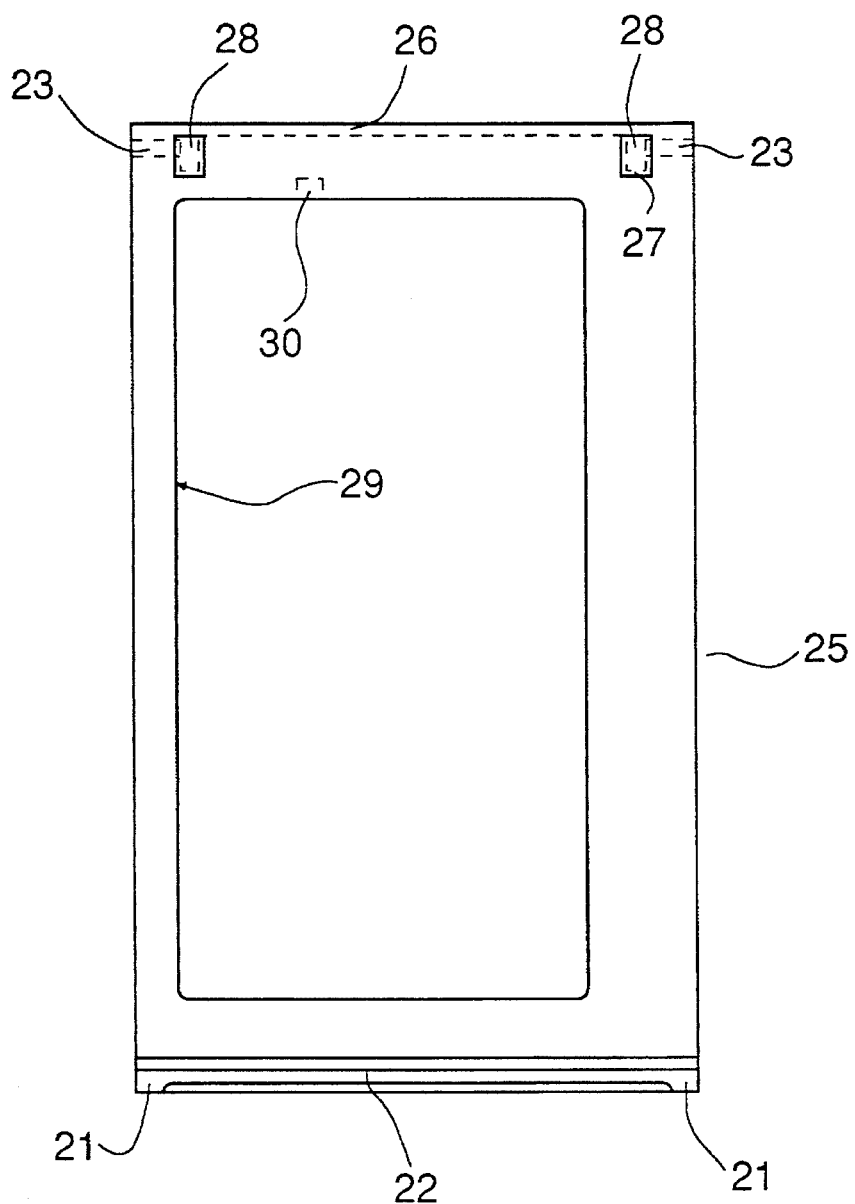
FIG. 2 shows a wall part configuration of the container from FIG. 1

The task of the webs 10 and 11 from FIG. 5 is performed here by a wall part 25, arranged movably between side walls 7 and 6 as an intermediate wall, which is shown in plan view (from below) in FIG. 2. The wall part 25 has here a cutout 29 corresponding to the bottom-wall cutout 8. However, it may also be configured without a cutout or with a reduced cutout.

On the front side of the wall part 25 there are provided resting continuations 21, which stand up directly on the inner surface of the top wall 13 and which may, if appropriate, be connected by a transverse web 22 for stiffening. The rear end of the wall part 25 may be formed with one or more holding continuations 23, which correspond in overall surface area approximately to the sum of the height H1 of the cassette-receiving space 12 and the height H2 of the insert-receiving space 15. The resting continuations 21 and, if appropriate, the continuation as transverse web 22 have a height H2 corresponding to the insert-receiving space.

On the rear side of the wall part 25 there may likewise be provided a web 26 for stiffening. Clearances 27 may also be provided in the wall part 25, at the rear end of the latter, in order that arresting projections 28, which may be formed together with the holding continuations 23 (as FIG. 3 shows), are able to be demolded by removal of slides.

An arresting lug 30 may be provided on the border of the wall-part cutout 29. In FIG. 3, the wall part 25 with its fastening can be seen well in longitudinal section. In this figure, 25' is the wall part with empty container 10 or empty cassette-receiving space 15 and still to be removed insert and 25 is the wall part in the state of having been filled at least with a cassette. The slightly protruding position of the wall part 25' shows an intentional prestressing of the wall part with respect to the container 20. For producing the prestressing, the continuation or continuations may, for example, be molded on the wall part 25 at an angle of a little >90° (see FIG. 3A), with the result that the continuations may still be referred to as provided substantially perpendicularly to the surface of the wall part.

In the example described above, the holding continuation or continuations 23 is or are able to be hung behind a holding web 31 on the bottom part 17 and is or are consequently able to be fixed before the top part 18 is connected to the bottom part 17.

As FIG. 4 shows by a container 40, the wall part 32 is also able to be produced in one piece directly on the rear wall 33 of the bottom part 35 by means of film hinge 34. In the dot-dashed position, the wall part 32' is represented in the production position and, shaded, as 32 in the installation position.

In this example, the top part 36 is formed with drawn-up rear wall part 37 and is, for example, able to be connected at the location 38 to the bottom part 35. As material, for the top part 18 or 36 respectively in FIGS. 3 and 4 a transparent material is shown and for the bottom part (17 or 35 respectively) an opaque material is shown. All suitable materials can be used.

In the last example with the film-hinge connection of bottom part 35 and wall part 32, holding continuations are not molded on as an extra addition as described above; in this case, the rear wall part 33 of the bottom part 35 functionally forms a transversely lying holding continuation, which substantially determines the height H1.

The adjustability or displaceability of the wall part 25 (and of all the other wall parts according to the invention) may take place as shown in FIG. 1 by means of a wedge-shaped formation (conicity) of the inner surfaces 39 of the bottom-part side wall 6, the wall thicknesses increasing from the bottom (from the top part 4) to the top (to the bottom wall 7). In this case, a wedge angle in the range of less than 3°, in particular from 0.5° to 1.5°, has been found to be favorable.

Both inner surfaces 39 may in this case have substantially the same wedge-form inclination.

Similarly, the outer surfaces facing these inner surfaces 39, or edges 41, of the wall part 25 may themselves have a bevel or chamfer which may correspond to the wedge-form inclination of the inner surfaces 39.

When displacing the wall part 25 in the vertical (arrow A in FIG. 1), a clamping effect occurs between said wall part and the side walls 6 and holds the wall part 25 in its displaced position. This clamping effect can be counteracted by applying a force acting oppositely to the arrow A, with the result that pushing down into the position in FIG. 1 can be carried out by hand.

In this case, the clamping force is as far as possible to be less than 200 mN.

In principle, the wall part 25 is to have a width, or the side wall parts 6 are to have a distance from each other such that the wall part 25 is able to be fixed releasably between the surfaces. The fixing can also be achieved by other means for producing an adhering effect, such as specific material selection, or a specific roughening of the facing surfaces 39 and 41 or else by a lip formation on the edge 41.

For fixing the wall part 25, catching lugs or strips (not shown) may also be used on the inner surfaces of the side wall parts 6.

It is also possible without further measures to make use just of the flexibility of the wall part 25 and/or of the side walls 6 in its height vertical position between the side walls.

Instead of the cutout 8 in the bottom wall 7, a cutout may also be provided in the outer-lying side wall 6 for reaching into and pushing out the cassette 9 (not shown).

Bottom part 17 and 35 and top part 18 and 36 of the containers 20 and 40 according to the invention are described each by an example, but may be formed and interconnected quite differently; all that is important is that an approximately cuboid-form container is obtained, on which at least one wall side can be opened or is open.

The container 20 may consist of any desired thermoplastic materials suitable for injection molding, it being desirable for bottom part and top part to be capable of welding, adhesively bonding or positively connecting to each other. The material of the wall part should preferably have at least slight flexibility.

The invention relates to a container for at least two separate articles with separate receiving spaces, the dividing wall being movable and it being possible as a result to momentarily vary the size of the receiving spaces, thereby also facilitating the accessibility and removability of the articles.

The container can be suitably used for any type of articles, in particular for recording carriers and insert sheets.

We claim:

1. A container of substantially cuboid form comprising bottom and top parts fox: at least two articles, said bottom and top parts being provided with at least one side wall part each and one rear wall part each and having at least one dividing intermediate wall, which is substantially flat and divides the cuboid-form interior into at least two receiving spaces lying flat one above the other for the articles, said dividing intermediate wall having approximately perpendicularly to its surface at least one continuation whose height corresponds to the height of the receiving spaces for each of said at least two articles, wherein said dividing intermediate wall is an at least partly movable wall part, which is vertically displaceably arranged between the side wall parts of the container for varying the volumes of the receiving spaces for each of said at least two articles.

2. A container as claimed in claim 1, wherein the at least partly movable wall part is a part produced separately from said bottom and top parts for being connected thereto before said bottom and top parts are connected to one another.

3. A container as claimed in claim 1, wherein the at least partly movable wall part is connected to either the bottom or top part, by a film hinge.

4. A container as claimed in claim 1, wherein the at least partly movable wall part has a width for being fixed releasably between the mutually facing inner surfaces of the side wall parts.

5. A container as claimed in claim 4, wherein the at least partly movable wall part is clamped in between the inner surfaces of the side wall part with a clamping force of less than 200 mN.

6. A container as claimed in claim 1, wherein the inner surfaces of the side wall parts have a conicity.

7. A container as claimed in claim 1, wherein on the inner surfaces of the side wall parts there are provided catching lugs which can be overcome when the movable wall part is vertically displaced.

8. A container as claimed in claim 1, wherein in the region of the front edge of the at least partly movable wall part there is provided a transverse rib, by the height of which the clear height (H2) of a receiving space is determined.

9. A container as claimed in claim 1, wherein on the rear part of the at lest partly movable wall part there is provided at least one holding continuation, the height of which corresponds approximately to the sum of the clear heights of the two receiving spaces.

10. A container as claimed in claim 1, wherein on the at least partly movable wall part there is provided at least one catching or arresting lug for the article to be received in the container.

11. A container as claimed in claim 9, wherein arresting projections are provided on the at least one holding continuation, and clearances are provided in the movable wall part above the arresting projections.

12. A container as claimed in claim 1, wherein the bottom part substantially comprises a bottom wall and rear and side wall parts.

13. A container as claimed in claim 1, wherein the top part substantially comprises a top wall and a side wall part.

14. A container as claimed in claim 1, wherein one of the bottom, top or outer side wall parts has a cutout for reaching into and pushing out the article received.

15. A container as claimed in claim 1, wherein the at least partly movable wall part has a cutout.

16. A container as claimed in claim 1, wherein the bottom wall has at least one cutout for reaching into and pushing out the article received.

17. A container as claimed in claim 6, wherein the conicity of the inner surfaces of the side wall parts is less than 3°.

18. A container as claimed in claim 1, wherein the at least two articles comprise a recording carrier and an insert in the form of a sheet or card.

* * * * *

UNITED STATES PATENT AND TRADEMARK OFFICE
CERTIFICATE OF CORRECTION

PATENT NO.: 5,458,236

DATED: October 17, 1995

INVENTOR(S): SCHOETTLE et al.

It is certified that error appears in the above-identified patent and that said Letters Patent is hereby corrected as shown below:

Column 5, claim 1, line 55, "fox" should read --for--.

Column 6, claim 9, line 32, "lest" should read --least--.

Signed and Sealed this

Nineteenth Day of December, 1995

*Attest:*

BRUCE LEHMAN

*Attesting Officer*     Commissioner of Patents and Trademarks